US012097150B2

(12) United States Patent
Chancy et al.

(10) Patent No.: US 12,097,150 B2
(45) Date of Patent: Sep. 24, 2024

(54) DRAINAGE BAG HEIGHT ACTUATOR

(71) Applicant: C. R. Bard, Inc., Franklin Lakes, NJ (US)

(72) Inventors: Patrick Hudson Chancy, Atlanta, GA (US); Dinesh Puppala, San Bruno, CA (US); Jill Walthall Jones, Avondale Estates, GA (US); D. Claire Gloeckner, Lilburn, GA (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 122 days.

(21) Appl. No.: 17/796,604

(22) PCT Filed: Dec. 22, 2020

(86) PCT No.: PCT/US2020/066707

§ 371 (c)(1),
(2) Date: Jul. 29, 2022

(87) PCT Pub. No.: WO2021/154427

PCT Pub. Date: Aug. 5, 2021

(65) Prior Publication Data

US 2023/0054937 A1 Feb. 23, 2023

Related U.S. Application Data

(60) Provisional application No. 62/968,772, filed on Jan. 31, 2020.

(51) Int. Cl.
*A61G 7/05* (2006.01)
*A61G 7/00* (2006.01)

(52) U.S. Cl.
CPC ............ *A61G 7/0503* (2013.01); *A61G 7/05* (2013.01); *A61G 2203/40* (2013.01)

(58) Field of Classification Search
CPC .... A61G 7/0503; A61G 7/05; A61G 2203/40; A61G 2203/30
(Continued)

(56) References Cited

U.S. PATENT DOCUMENTS 3,114,916 A 12/1963 Hadley
3,583,401 A 6/1971 Vailiancourt et al.
(Continued)

FOREIGN PATENT DOCUMENTS

EP 1872752 A1 1/2008
EP 2417955 A2 * 2/2012 ............ A61G 7/018
(Continued)

OTHER PUBLICATIONS

U.S. Appl. No. 17/542,060, filed Dec. 3, 2021 Non-Final Office Action dated Jun. 27, 2023.
(Continued)

*Primary Examiner* — Robert G Santos
(74) *Attorney, Agent, or Firm* — Rutan & Tucker LLP

(57) ABSTRACT

Disclosed herein is a system, apparatus and method directed to automated adjustment of a positioning of a drainage bag based on at least an amount of tension within a tubing extending from the drainage bag. The system, apparatus and method pertain to an automated drainage bag actuation system that includes at least a first railing, a control box coupled to the first railing and configured to receive mounting fasteners that couple a drainage bag to the control box, the control box including a tension load cell sensor, a first motor, and circuitry electrically coupled to the first motor and the tension load cell sensor. The circuitry is configured to receive data from the tension load cell sensor indicating an amount of tension in tubing extending from the drainage
(Continued)

bag and transmit one or more electrical signals to activate the first motor causing adjustment of a positioning of the drainage bag.

19 Claims, 6 Drawing Sheets

(58) Field of Classification Search
USPC .................................. 5/606, 600, 503.1, 658
See application file for complete search history.

(56) References Cited

U.S. PATENT DOCUMENTS

| | | | | |
|---|---|---|---|---|
| 3,598,124 | A | 8/1971 | Andersen et al. | |
| 3,661,143 | A | 5/1972 | Henkin | |
| 3,861,394 | A | 1/1975 | Villari | |
| 3,901,235 | A | 8/1975 | Patel et al. | |
| 3,955,574 | A | 5/1976 | Rubinstein | |
| 4,084,593 | A | 4/1978 | Jarund | |
| 4,265,243 | A | 5/1981 | Taylor | |
| 4,305,403 | A | 12/1981 | Dunn | |
| 4,315,506 | A | 2/1982 | Kayser et al. | |
| 4,360,933 | A | 11/1982 | Kimura et al. | |
| 4,465,485 | A | 8/1984 | Kashmer et al. | |
| 4,531,939 | A | 7/1985 | Izumi | |
| 4,631,061 | A | 12/1986 | Martin | |
| 4,654,029 | A | 3/1987 | D'Antonio | |
| 4,747,166 | A | 5/1988 | Kuntz | |
| 4,819,684 | A | 4/1989 | Zaugg et al. | |
| 4,872,579 | A | 10/1989 | Palmer | |
| 4,990,137 | A | 2/1991 | Graham | |
| 5,002,528 | A | 3/1991 | Palestrant | |
| 5,071,411 | A | 12/1991 | Hillstead | |
| 5,186,431 | A | 2/1993 | Tamari | |
| 5,318,550 | A | 6/1994 | Cermak et al. | |
| 5,405,319 | A | 4/1995 | Abell et al. | |
| 5,738,656 | A | 4/1998 | Wagner et al. | |
| 5,813,842 | A | 9/1998 | Tamari | |
| 5,894,608 | A | 4/1999 | Birbara | |
| 6,007,521 | A | 12/1999 | Bidwell et al. | |
| 6,106,506 | A | 8/2000 | Abell et al. | |
| 6,183,454 | B1 | 2/2001 | Levine et al. | |
| 8,266,741 | B2 * | 9/2012 | Penninger | A61G 7/053 5/613 |
| 8,337,475 | B2 | 12/2012 | Christensen et al. | |
| 8,475,419 | B2 | 7/2013 | Eckermann | |
| 8,512,301 | B2 | 8/2013 | Ma | |
| 10,391,275 | B2 | 8/2019 | Burnett et al. | |
| 10,426,919 | B2 | 10/2019 | Erbey, II et al. | |
| 10,506,965 | B2 | 12/2019 | Cooper et al. | |
| 10,737,057 | B1 | 8/2020 | Mikhail et al. | |
| 10,772,998 | B2 | 9/2020 | Luxon et al. | |
| 2002/0000253 | A1 | 1/2002 | Fillmore et al. | |
| 2002/0161317 | A1 | 10/2002 | Risk et al. | |
| 2003/0078638 | A1 | 4/2003 | Voorhees et al. | |
| 2004/0176746 | A1 | 9/2004 | Forral | |
| 2004/0230181 | A1 | 11/2004 | Cawood | |
| 2004/0236292 | A1 | 11/2004 | Tazoe et al. | |
| 2004/0254547 | A1 | 12/2004 | Okabe et al. | |
| 2005/0209585 | A1 | 9/2005 | Nord et al. | |
| 2005/0245898 | A1 | 11/2005 | Wright et al. | |
| 2005/0261619 | A1 | 11/2005 | Gay | |
| 2006/0015190 | A1 | 1/2006 | Robertson | |
| 2006/0079854 | A1 | 4/2006 | Kay et al. | |
| 2006/0155260 | A1 | 7/2006 | Blott et al. | |
| 2006/0235353 | A1 | 10/2006 | Gelfand et al. | |
| 2006/0270971 | A1 | 11/2006 | Gelfand et al. | |
| 2006/0271019 | A1 | 11/2006 | Stoller et al. | |
| 2007/0078444 | A1 | 4/2007 | Larsson | |
| 2007/0142729 | A1 | 6/2007 | Pfeiffer et al. | |
| 2007/0272311 | A1 | 11/2007 | Trocki et al. | |
| 2008/0156092 | A1 | 7/2008 | Boiarski | |
| 2009/0157016 | A1 | 6/2009 | Adahan | |
| 2009/0157040 | A1 | 6/2009 | Jacobson et al. | |
| 2009/0326483 | A1 | 12/2009 | Green | |
| 2010/0106116 | A1 | 4/2010 | Simmons et al. | |
| 2010/0130949 | A1 | 5/2010 | Garcia | |
| 2011/0060300 | A1 | 3/2011 | Weig et al. | |
| 2012/0036638 | A1 * | 2/2012 | Penninger | A61G 7/0503 5/618 |
| 2012/0323144 | A1 | 12/2012 | Coston et al. | |
| 2013/0218106 | A1 | 8/2013 | Coston et al. | |
| 2014/0200558 | A1 | 7/2014 | McDaniel | |
| 2015/0126975 | A1 | 5/2015 | Wuthier | |
| 2015/0290448 | A1 | 10/2015 | Pavlik | |
| 2016/0135982 | A1 | 5/2016 | Garcia | |
| 2016/0183819 | A1 | 6/2016 | Burnett et al. | |
| 2016/0310711 | A1 | 10/2016 | Luxon et al. | |
| 2017/0072125 | A1 | 3/2017 | Wallenås et al. | |
| 2017/0136209 | A1 | 5/2017 | Burnett et al. | |
| 2017/0143566 | A1 | 5/2017 | Elku et al. | |
| 2017/0241978 | A1 | 8/2017 | Duval | |
| 2017/0312114 | A1 | 11/2017 | Glithero | |
| 2018/0015251 | A1 | 1/2018 | Lampotang et al. | |
| 2018/0071441 | A1 | 3/2018 | Croteau et al. | |
| 2018/0104391 | A1 | 4/2018 | Luxon et al. | |
| 2018/0110456 | A1 | 4/2018 | Cooper et al. | |
| 2018/0125697 | A1 | 5/2018 | Ferrera | |
| 2018/0177458 | A1 | 6/2018 | Burnett et al. | |
| 2018/0235523 | A1 | 8/2018 | Sauder | |
| 2018/0245699 | A1 | 8/2018 | Lee | |
| 2018/0360424 | A1 | 12/2018 | Yurek et al. | |
| 2019/0009021 | A1 | 1/2019 | Nelson et al. | |
| 2019/0009023 | A1 | 1/2019 | Diperna et al. | |
| 2019/0038451 | A1 | 2/2019 | Harvie | |
| 2019/0046102 | A1 | 2/2019 | Kushnir et al. | |
| 2019/0126006 | A1 | 5/2019 | Rehm et al. | |
| 2019/0143094 | A1 | 5/2019 | DeMeritt | |
| 2019/0151610 | A1 | 5/2019 | Fletter | |
| 2019/0343445 | A1 | 11/2019 | Burnett et al. | |
| 2020/0000979 | A1 | 1/2020 | Myers | |
| 2020/0061281 | A1 | 2/2020 | Desouza et al. | |
| 2020/0315837 | A1 | 10/2020 | Radl et al. | |
| 2021/0077007 | A1 | 3/2021 | Jouret et al. | |
| 2022/0152345 | A1 | 5/2022 | Simiele et al. | |
| 2022/0160949 | A1 | 5/2022 | Simiele et al. | |
| 2022/0176031 | A1 | 6/2022 | Cheng et al. | |
| 2022/0193366 | A1 | 6/2022 | Cheng et al. | |
| 2022/0218890 | A1 | 7/2022 | Chavan | |
| 2022/0218973 | A1 | 7/2022 | Chavan et al. | |
| 2022/0218974 | A1 | 7/2022 | Chavan et al. | |
| 2022/0273213 | A1 | 9/2022 | Sokolov et al. | |
| 2022/0305189 | A1 | 9/2022 | Chavan et al. | |
| 2022/0330867 | A1 | 10/2022 | Conley et al. | |
| 2022/0362080 | A1 | 11/2022 | McCorquodale et al. | |
| 2022/0409421 | A1 | 12/2022 | Hughett et al. | |
| 2023/0013353 | A1 | 1/2023 | Chavan et al. | |
| 2023/0030637 | A1 | 2/2023 | Gloeckner et al. | |
| 2023/0054937 | A1 * | 2/2023 | Chancy | A61G 7/0503 |
| 2023/0083906 | A1 | 3/2023 | Jones et al. | |
| 2023/0310837 | A1 | 10/2023 | Gamsizlar et al. | |
| 2024/0238500 | A1 | 7/2024 | Simiele et al. | |

FOREIGN PATENT DOCUMENTS

| | | | | |
|---|---|---|---|---|
| EP | 2730299 | A1 | 5/2014 | |
| WO | 2009/026237 | A1 | 2/2009 | |
| WO | 2012016179 | A1 | 2/2012 | |
| WO | 2015019056 | A1 | 2/2015 | |
| WO | 2015/105916 | A1 | 7/2015 | |
| WO | 2016012494 | A1 | 1/2016 | |
| WO | 2017177068 | A1 | 10/2017 | |
| WO | 2018136306 | A1 | 7/2018 | |
| WO | 2018191193 | A1 | 10/2018 | |
| WO | 2019004854 | A1 | 1/2019 | |
| WO | 2020/033752 | A1 | 2/2020 | |
| WO | WO-2021154427 | A1 * | 8/2021 | A61G 7/0503 |
| WO | 2022/159333 | A1 | 7/2022 | |

(56) References Cited

FOREIGN PATENT DOCUMENTS

| | | | |
|---|---|---|---|
| WO | 2022/251425 | A1 | 12/2022 |
| WO | 2023086394 | A1 | 5/2023 |

OTHER PUBLICATIONS

U.S. Appl. No. 17/556,942, filed Dec. 20, 2021 Advisory Action dated Sep. 1, 2023.
U.S. Appl. No. 17/556,942, filed Dec. 20, 2021 Final Office Action dated Jul. 12, 2023.
U.S. Appl. No. 17/561,458, filed Dec. 23, 2021 Final Office Action dated Sep. 12, 2023.
U.S. Appl. No. 17/561,458, filed Dec. 23, 2021 Non-Final Office Action dated Jun. 16, 2023.
U.S. Appl. No. 17/561,504, filed Dec. 23, 2021 Final Office Action dated Jul. 19, 2023.
U.S. Appl. No. 17/863,898, filed Jul. 13, 2022 Non-Final Office Action dated Jul. 17, 2023.
U.S. Appl. No. 17/902,705, filed Sep. 2, 2022 Final Office Action dated Aug. 17, 2023.
PCT/US2020/066707 filed Dec. 22, 2020 International Search Report and Written Opinion dated Apr. 15, 2021.
PCT/US2022/012373 filed Jan. 13, 2022 International Search Report and Written Opinion dated Apr. 19, 2022.
U.S. Appl. No. 17/373,568, filed Jul. 12, 2021 Non-Final Office Action dated Nov. 9, 2023.
U.S. Appl. No. 17/526,994, filed Nov. 15, 2021 Advisory Action dated Jan. 19, 2024.
U.S. Appl. No. 17/526,994, filed Nov. 15, 2021 Final Office Action dated Oct. 24, 2023.
U.S. Appl. No. 17/532,454, filed Nov. 22, 2021 Final Office Action dated Sep. 27, 2023.
U.S. Appl. No. 17/532,454, filed Nov. 22, 2021 Notice of Allowance dated Dec. 8, 2023.
U.S. Appl. No. 17/542,060, filed Dec. 3, 2021 Non-Final Office Action dated Nov. 28, 2023.
U.S. Appl. No. 17/556,942, filed Dec. 20, 2021 Non-Final Office Action dated Nov. 3, 2023.
U.S. Appl. No. 17/561,458, filed Dec. 23, 2021 Notice of Allowance dated Dec. 6, 2023.
U.S. Appl. No. 17/561,504, filed Dec. 23, 2021 Non-Final Office Action dated Nov. 27, 2023.
U.S. Appl. No. 17/561,504, filed Dec. 23, 2021 Notice of Allowance dated Jan. 22, 2024.
U.S. Appl. No. 17/863,898, filed Jul. 13, 2022 Advisory Action dated Jan. 30, 2024.
U.S. Appl. No. 17/863,898, filed Jul. 13, 2022 Final Office Action dated Nov. 22, 2023.
U.S. Appl. No. 17/902,705, filed Sep. 2, 2022 Advisory Action dated Oct. 19, 2023.
U.S. Appl. No. 17/902,705, filed Sep. 2, 2022 Non-Final Office Action dated Dec. 7, 2023.
PCT/US2022/049418 filed Nov. 9, 2022 International Search Report and Written Opinion dated Feb. 10, 2023.
U.S. Appl. No. 17/526,994, filed Nov. 15, 2021 Restriction Requirement dated Jan. 3, 2023.
U.S. Appl. No. 17/556,942, filed Dec. 20, 2021 Non-Final Office Action dated Jan. 31, 2023.
U.S. Appl. No. 17/526,994, filed Nov. 15, 2021 Non-Final Office Action dated May 10, 2023.
U.S. Appl. No. 17/532,454, filed Nov. 22, 2021 Non-Final Office Action dated Mar. 22, 2023.
U.S. Appl. No. 17/561,504, filed Dec. 23, 2021 Non-Final Office Action dated Mar. 14, 2023.
U.S. Appl. No. 17/902,705, filed Sep. 2, 2022 Non-Final Office Action dated May 24, 2023.
U.S. Appl. No. 17/373,568, filed Jul. 12, 2021 Notice of Allowance dated Apr. 26, 2024.
U.S. Appl. No. 17/526,994, filed Nov. 15, 2021 Non-Final Office Action dated Apr. 22, 2024.
U.S. Appl. No. 17/542,060, filed Dec. 3, 2021 Notice of Allowance dated Jun. 3, 2024.
U.S. Appl. No. 17/556,942, filed Dec. 20, 2021 Final Office Action dated Apr. 4, 2024.
U.S. Appl. No. 17/863,898, filed Jul. 13, 2022 Non-Final Office Action dated Mar. 11, 2024.
U.S. Appl. No. 17/902,705, filed Sep. 2, 2022 Final Office Action dated May 22, 2024.
U.S. Appl. No. 17/556,942, filed Dec. 20, 2021 Notice of Allowance dated Jun. 26, 2024.

* cited by examiner

DRAINAGE BAG HEIGHT ACTUATOR

PRIORITY

This application is a U.S. national stage application of International Application No. PCT/US2020/066707, filed Dec. 22, 2020, which claims the benefit of priority to U.S. Provisional Application No. 62/968,772, filed Jan. 31, 2020, each of which is incorporated by reference in its entirety into this application.

SUMMARY

Briefly summarized, embodiments disclosed herein are directed to systems, methods and apparatuses for determining the tension of a catheter tubing extending from a patient to a drainage bag and automatically adjusting the positioning of the drainage bag when the tension is outside of a preferred range.

One problem that often arises with catheter tubing, especially when coupled to a bed frame, is the existence a dependent loop due to a lack of tension within the catheter tubing. One cause of dependent loops in catheter tubing is the length of tubing utilized. Excess tubing may be utilized by medical professionals to enable a patient to move (e.g., roll side to side, sit up, etc.). Although necessary to provide comfort for and the ability to move to the patient, excess tubing may lead to dependent loops.

A dependent loop in the catheter tubing includes a section of the tubing that is positively sloping, which requires fluid to overcome gravity before the fluid reaches the drainage bag. Multiple problems arise with a dependent loop including that the fluid in the tube is not measured and the fluid often gets caught within the dependent loop. Therefore, a medical professional may not obtain an accurate reading of the fluid passed by the patient and as a result, incorrectly assess the status of the patient's health.

A second problem resulting from a dependent loop is that the fluid passed by the patient is required to overcome gravity in order to reach the drainage bag, thus requiring a higher pressure exerted by the bladder to flow. The exertion of higher pressure may cause damage to the patient and even cause fluid to be held within the bladder thereby increasing the risk of infection. Embodiments of the disclosure provide for systems, methods and apparatuses that measure the amount of tension in the catheter tubing and automatically adjust the positioning of the drainage bag when necessary such that the tension in the catheter tubing once again falls within a preferred range. As a result, the patient maintains comfort and fluid is able to flow to the drainage bag using gravity due to a continuous negative slope along the length of the tubing.

An automated drainage bag actuation system is disclosed that comprises a first railing, a control box coupled to the first railing and configured to receive mounting fasteners that couple a drainage bag to the control box, the control box including a tension load cell sensor, a first motor and circuitry electrically coupled to the first motor and the tension load cell sensor. In some embodiments, the circuitry is configured to receive data from the tension load cell sensor indicating an amount of tension in tubing extending from the drainage bag and transmit one or more electrical signals to activate the first motor causing adjustment of a positioning of the drainage bag.

In some embodiments, the automated drainage bag actuation system further comprises an infrared (IR) sensor coupled to the circuitry, the IR sensor configured to obtain a distance measurement of a distance between the IR sensor and a ground surface or intervening object, wherein the one or more electrical signals activating the first motor are based in part on the distance measurement.

In some embodiments, the automated drainage bag actuation system further comprises a second railing coupled to the first railing. In one embodiment, activation of the first motor causes adjustment of the positioning of the drainage bag in a vertical direction along the second railing. In an alternative embodiment, activation of the first motor causes adjustment of the positioning of the drainage bag rotationally about the second railing.

In some embodiments, the automated drainage bag actuation system further comprises a base including a second motor, wherein the circuitry is configured to receive the data from the tension load cell sensor indicating the amount of tension in the tubing extending from the drainage bag and transmit the one or more electrical signals to activate the second motor causing adjustment of the positioning of the drainage bag.

In yet other embodiments, the automated drainage bag actuation system further comprises one or more tracks, wherein activation of the second motor causes horizontal movement along the one or more tracks. In further embodiments, the second motor causes rotation of the drainage bag about a vertical axis.

In some embodiments, the first railing is a horizontal railing and activation of the first motor causes horizontal movement of the drainage bag along the first railing. The circuitry may be located within the control box.

Additionally, a method of automatically adjusting a positioning of a drainage bag is disclosed. The method comprises operations of providing an automated drainage bag actuation system that includes a first railing, a control box coupled to the first railing and configured to receive mounting fasteners that couple a drainage bag to the control box, the control box including a tension load cell sensor, a first motor, and circuitry electrically coupled to the first motor and the tension load cell sensor.

In some embodiments of the method, the automated drainage bag actuation system further comprises an infrared (IR) sensor coupled to the circuitry, the IR sensor configured to obtain a distance measurement of a distance between the IR sensor and a ground surface or intervening object, wherein the one or more electrical signals activating the first motor are based in part on the distance measurement.

In some embodiments of the method, the automated drainage bag actuation system further comprises a second railing coupled to the first railing. In one embodiment of the method, activation of the first motor causes adjustment of the positioning of the drainage bag in a vertical direction along the second railing. In an alternative embodiment of the method, activation of the first motor causes adjustment of the positioning of the drainage bag rotationally about the second railing.

In some embodiments of the method, the automated drainage bag actuation system further comprises a base including a second motor, wherein the circuitry is configured to receive the data from the tension load cell sensor indicating the amount of tension in the tubing extending from the drainage bag and transmit the one or more electrical signals to activate the second motor causing adjustment of the positioning of the drainage bag.

In yet other embodiments of the method, the automated drainage bag actuation system further comprises one or more tracks, wherein activation of the second motor causes horizontal movement along the one or more tracks. In further embodiments of the method, the second motor causes rotation of the drainage bag about a vertical axis.

In some embodiments of the method, the first railing is a horizontal railing and activation of the first motor causes horizontal movement of the drainage bag along the first railing. The circuitry may be located within the control box.

These and other features of the concepts provided herein will become more apparent to those of skill in the art in view of the accompanying drawings and following description, which disclose particular embodiments of such concepts in greater detail.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
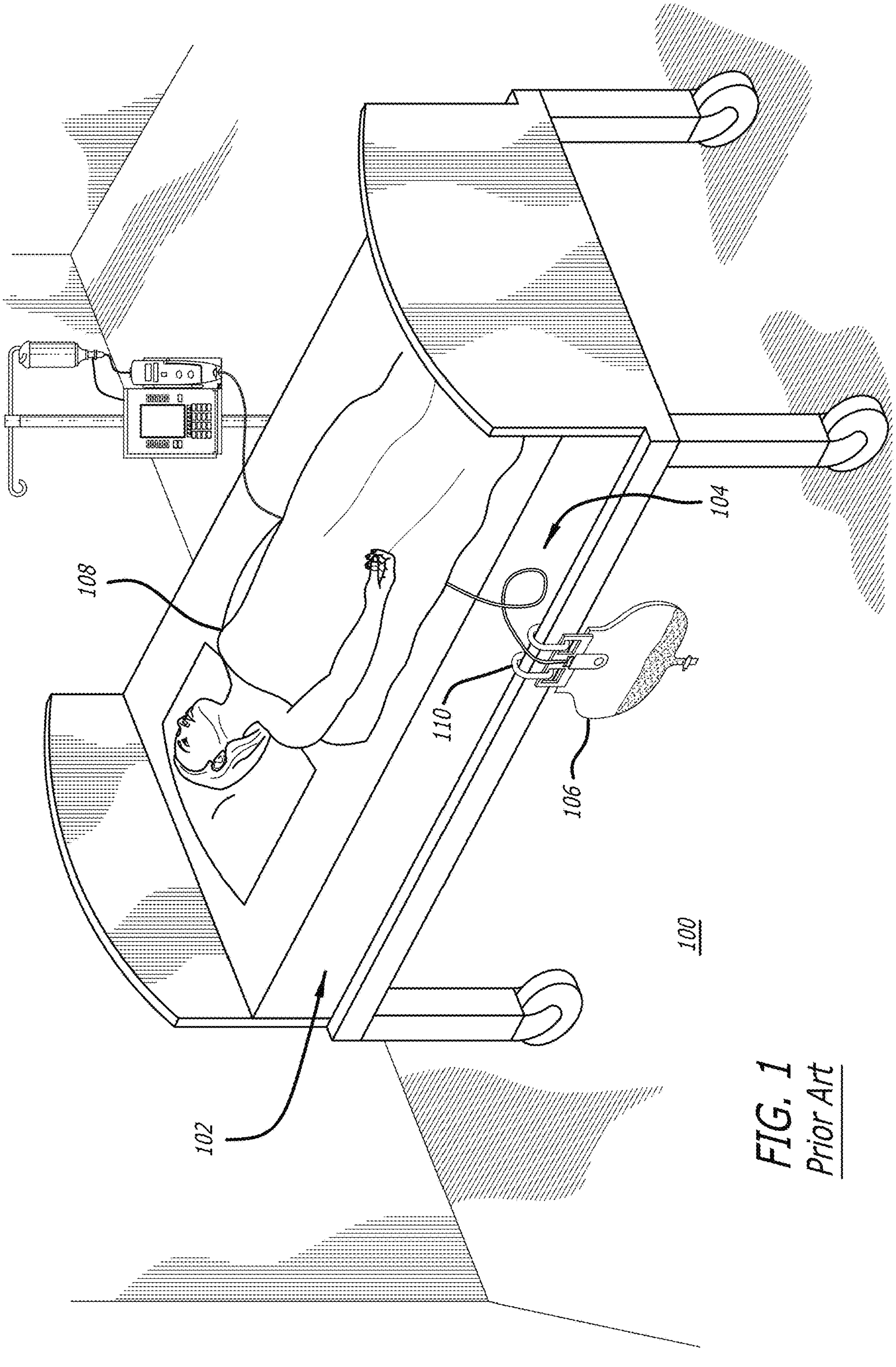
FIG. 1 Prior Art
FIG. 1 illustrates an exemplary hospital room environment including a hospital bed on which a patient is located according to some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal end portion" of, for example, a probe disclosed herein includes a portion of the probe intended to be near a clinician when the probe is used on a patient. Likewise, a "proximal length" of, for example, the probe includes a length of the probe intended to be near the clinician when the probe is used on the patient. A "proximal end" of, for example, the probe includes an end of the probe intended to be near the clinician when the probe is used on the patient. The proximal portion, the proximal end portion, or the proximal length of the probe can include the proximal end of the probe; however, the proximal portion, the proximal end portion, or the proximal length of the probe need not include the proximal end of the probe. That is, unless context suggests otherwise, the proximal portion, the proximal end portion, or the proximal length of the probe is not a terminal portion or terminal length of the probe.

With respect to "distal," a "distal portion" or a "distal end portion" of, for example, a probe disclosed herein includes a portion of the probe intended to be near or in a patient when the probe is used on the patient. Likewise, a "distal length" of, for example, the probe includes a length of the probe intended to be near or in the patient when the probe is used on the patient. A "distal end" of, for example, the probe includes an end of the probe intended to be near or in the patient when the probe is used on the patient. The distal portion, the distal end portion, or the distal length of the probe can include the distal end of the probe; however, the distal portion, the distal end portion, or the distal length of the probe need not include the distal end of the probe. That is, unless context suggests otherwise, the distal portion, the distal end portion, or the distal length of the probe is not a terminal portion or terminal length of the probe.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Referring to FIG. 1, a perspective view of an exemplary hospital room environment including a hospital bed on which a patient is located is shown according to some embodiments. FIG. 1 illustrates an exemplary drainage bag 106 coupled to a hospital bed 102 on which a patient 108 is located via mounting fasteners 110. Catheter tubing 104 is illustrated as extending from the patient 108 (e.g., which may include an inflatable balloon configured to be disposed within the patient 108's bladder) to the drainage bag 106 at a distal end of the tubing 104.

In particular, FIG. 1 illustrates a problem that often arises with catheter tubing, especially when coupled to a bed frame. The tubing 104 is positioned such that a dependent loop is formed in the length of the tubing 104. One cause of dependent loops in catheter tubing is the length of tubing utilized. As the patient 108 is not always immobile while lying in the hospital bed 102, excess tubing is utilized by medical professionals to enable the patient 108 to move (e.g., roll side to side, sit up, etc.). Although necessary to provide comfort for and the ability to move to the patient 108, excess tubing may lead to dependent loops.

As illustrated, the dependent loop in the tubing 104 includes a section of the tubing that is positively sloping, which requires fluid to overcome gravity before the fluid reaches the drainage bag 106. Multiple problems arise with a dependent loop. For example, one problem includes the fact that the fluid in the tube is not measured and fluid often gets caught within the dependent loop. Therefore, a medical professional may not obtain an accurate reading of the fluid passed by the patient 108 and as a result, incorrectly assess the status of the health of the patient 108. A second problem resulting from a dependent loop is that the fluid passed by the patient 108 is required to overcome gravity in order to reach the drainage bag 106, thus requiring a higher pressure exerted by the bladder to flow. The exertion of higher pressure may cause damage to the patient 108 and even cause fluid to be held within the bladder thereby increasing the risk of infection.

Figure 2A:
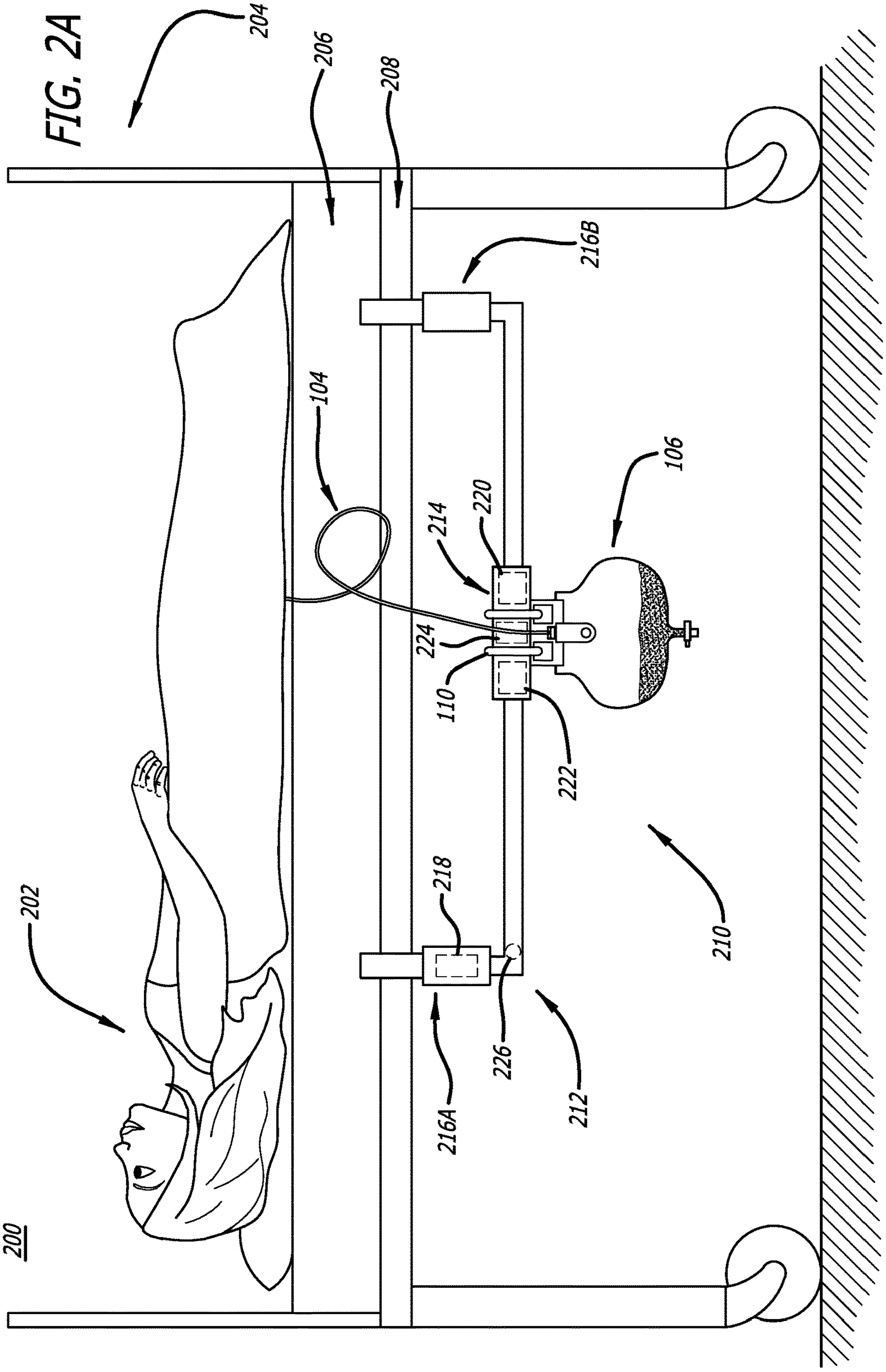
FIG. 2A illustrates a side view of a hospital bed coupled to a first embodiment of a drainage bag actuation system being in a first position according to some embodiments.

Referring to FIG. 2A, a side view of a hospital bed coupled to a first embodiment of a drainage bag actuation system being in a first position is shown according to some embodiments. FIG. 2A illustrates a hospital room environment 200 in which a patient 202 is located on a hospital bed 204. In the illustration, the hospital bed 204 includes at least a mattress 206 and a bed frame railing 208.

In contrast to the illustration of FIG. 1 in which the drainage bag 106 is coupled to the bed frame railing, the embodiment of FIG. 2A illustrates a drainage bag actuation system 210 coupled to the bed frame railing 208 and the drainage bag 106 coupled to the drainage bag actuation system 210. The drainage bag 106 is shown to be coupled to the control box 214 with the mounting fasteners 110. It should be noted that the drainage bag 106 and the mounting fasteners 110 may be utilized both in the current technology (e.g., coupled directly to the bed frame railing as shown in FIG. 1) and with multiple embodiments of the disclosure. Specifically, one benefit the embodiments of the disclosure provide is that the drainage bag actuation systems 214, 302 and 402 (of FIGS. 2A-2B, 3 and 4 respectively) do not require a new drainage bag or mounting mechanism from that currently being utilized in hospitals and other medical facilities.

The drainage bag actuation system 210 includes system railing 212, a control box 214, expandable rail components 216A-216B, a vertical displacement motor 218, a horizontal displacement motor 220, movement logic and/circuitry ("movement logic") 222, a tension load cell sensor 224 and an infrared (IR) sensor 226. The vertical displacement motor 218, the horizontal motor 220 and any other motor described herein may include a rotary actuator, a linear actuator, a closed-loop servomechanism or, more specifically, a servomotor. In some embodiments, a stepper motor may be utilized.

The IR sensor 226 may include an IR light emitter and an IR light detector. The IR sensor 226 emits an IR light beam, detects the reflection off of a surface and calculates the distance through triangulation. In the illustration of FIG. 2A, the drainage bag actuation system 210 is illustrated in a first position, wherein the first position refers to a raised position with the expandable rail components 216A-216B in a compressed state. In comparison, FIG. 2B illustrates the drainage bag actuation system 210 in a second position, wherein the second position refers to a lowered position with the expandable rail components 216A-216B in an expanded state.

Figure 2B:
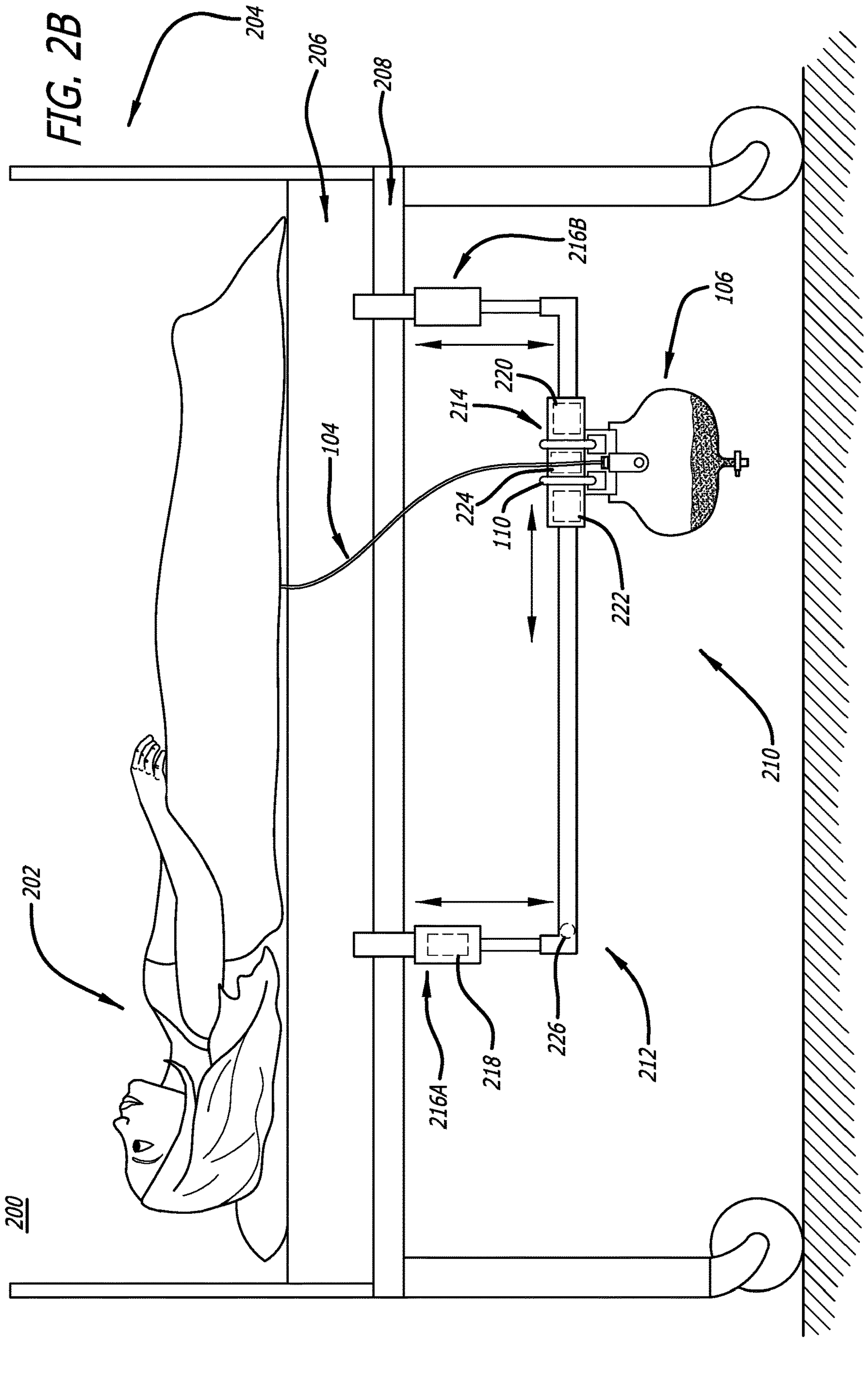
FIG. 2B illustrates a side view of the hospital bed of FIG. 2A coupled to the drainage bag actuation system being in a second position according to some embodiments.

The embodiment of the drainage bag actuation system 210 illustrated in FIGS. 2A-2B may automatically adjust the positioning of the drainage bag 106 by moving the control box 214 in order to alter the positioning of the catheter tubing 104 to remove any dependent loops. Therefore, the drainage bag actuation system 210 provides numerous benefits to medical professionals and medical patients by solving problems of the embodiment illustrated in FIG. 1 as discussed above. Specifically, by automatically adjusting the positioning of the drainage bag 106 to remove dependent loops within the catheter tubing 104, the drainage bag actuation system 210 creates a negative slope in the tubing 104. As a result, fluid does not get caught in the tubing 104 and the bladder of the patient 202 does not have to exert pressure for the fluid to reach the drainage bag 106.

The drainage bag actuation system 210 includes movement logic 222 within the control box 214 that obtains measurements from the tension load cell sensor 224 and determines whether tension of the catheter tubing 104 is within a predetermined preferred range. Upon determining that the tension of the tubing 104 exceeds an upper threshold of the predetermined preferred range, the movement logic 222 provides an electrical signal to either the vertical displacement motor 218 and/or the horizontal displacement motor 220 thereby activating one or both motors.

Activating the vertical displacement motor 218 causes the expandable rail components 216A-216B to expand moving the drainage bag actuation system 210 from a first (raised) position to a second (lowered) position. Activation of the vertical displacement motor 218 may be dependent on measurements obtained by the IR sensor 226, which indicate a distance between a ground surface (or intervening object, collectively referred to as "ground surface" for purposes of clarity) and a location of the IR sensor 226. For example, a measurement taken by the IR sensor 226 is provided to the movement logic 222 prior to activating the vertical displacement motor 218. Based on known dimensions of the drainage bag 106 (which may be modified via configuration files of the movement logic 222), the movement logic 222 determines the distance between the bottom of the drainage bag 106 and the ground surface based on the distance calculation by the IR sensor 226.

When the distance is greater than a minimum distance threshold, the movement logic 222 may activate the vertical displacement motor 218 to move the system railings 212 in a downward direction (i.e., toward the ground surface). The movement logic 222 may receive measurements from the IR sensor 226 and the tension load cell sensor 224 at regular intervals while the vertical displacement motor 218 is activated. The measurements (received via electrical signals) enable the movement logic 222 to determine (i) when the tension of the catheter tubing 104 is within the predetermined preferred range, and (ii) when the distance between the bottom of the drainage bag 106 and the ground surface is equal to the minimum distance threshold. In the situation in which the tension of the catheter tubing 104 is above an upper threshold of the predetermined preferred range and the distance between the bottom of the drainage bag 106 and the ground surface is equal to the minimum distance threshold, the movement logic 222 may deactivate the vertical displacement motor 218 and activate the horizontal displacement motor 220. However, it should be noted that the horizontal displacement motor 220 may be activated prior to the vertical displacement motor 218. The determination as to an ordering of motor activation may be made on contents of a configuration file that is accessible to the movement logic 222 (e.g., stored with, included as part of or otherwise accessible by the movement logic 222). Similarly, other movement logic of the disclosure may access a configuration file when determining an ordering of activation of motors.

When the distance between the bottom of the drainage bag 106 and the ground surface is equal to (or exceeds) the minimum distance threshold, the movement logic 222 does not activate the vertical displacement motor 218 in order to avoid placing the drainage bag 106 close to or in direct contact with the ground surface. Instead, the movement logic 222 may activate the horizontal displacement motor 220 causing the control box 214 to move horizontally.

During activation of any motor of the drainage bag actuation system 210, the movement logic 222 receives measurements from the tension load cell sensor 224 at regular intervals in order to deactivate the motor(s) when the tension of the tubing 104 is within the predetermined preferred range.

Referring now to FIG. 2B, a side view of the hospital bed of FIG. 2A coupled to the drainage bag actuation system being in a second position is shown according to some embodiments. As illustrated in FIG. 2B, the expandable rail components 216A-216B have been moved from a first (raised) position to a second (lowered) position and the control box 214 has moved from a first position to a second position horizontally distal to the head of the patient 202. As a result of the movements of the drainage bag actuation system 210, the tension in the tubing 104 has increased such that the dependent loop has been removed.

Figure 3:
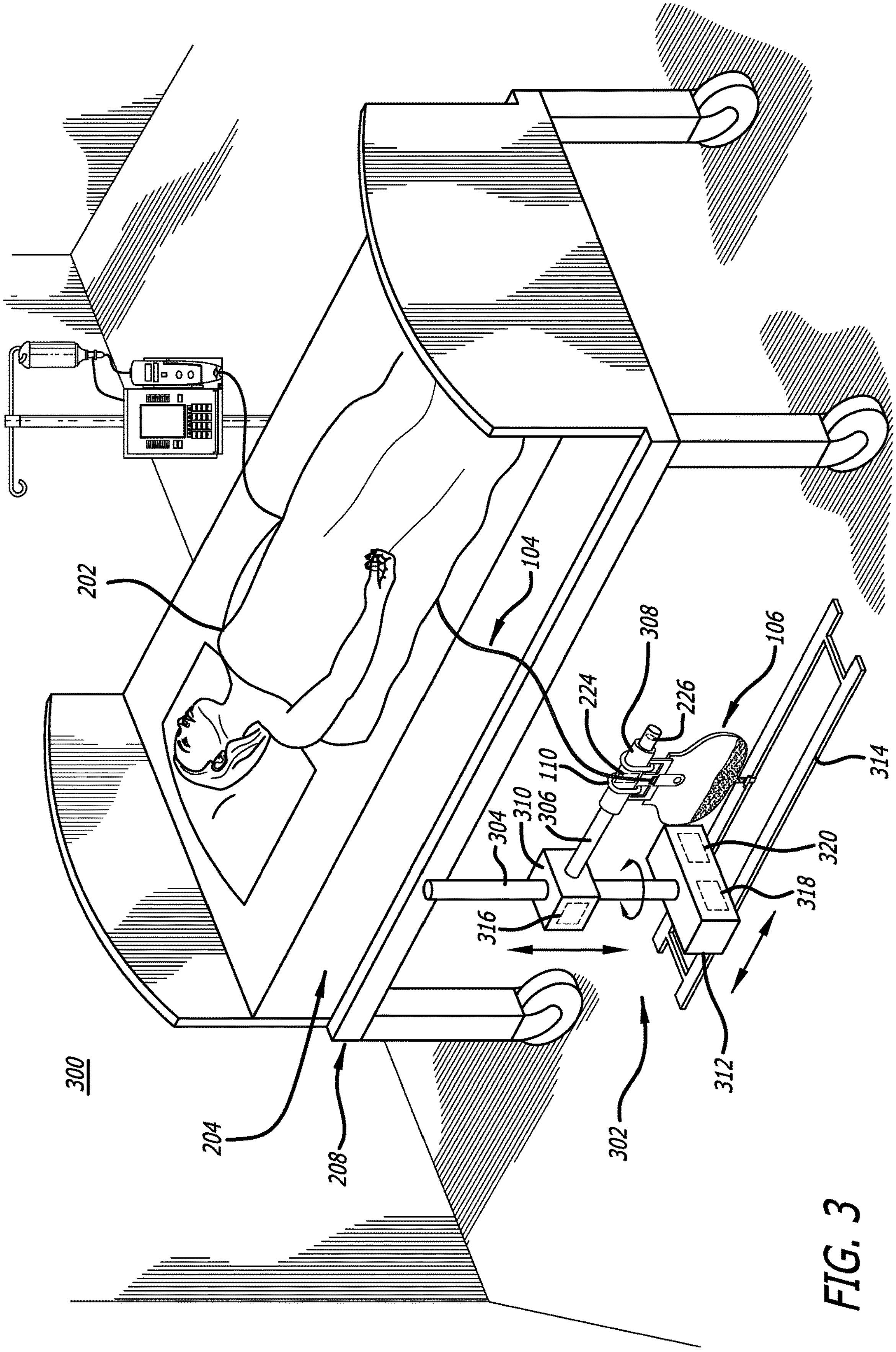
FIG. 3 illustrates a perspective view of a hospital bed coupled to a second embodiment of a drainage bag actuation system according to some embodiments.

Referring to FIG. 3, a perspective view of a hospital bed coupled to a second embodiment of a drainage bag actuation system is shown according to some embodiments. FIG. 3 illustrates a hospital room environment 300 in which a patient 202 is located on a hospital bed 204 that includes a bed frame railing 208. In a similar manner as illustrated in FIGS. 2A-2B, catheter tubing 104 extends from the patient 202 to the drainage bag 106, which is not coupled directly to the bed frame railing 208. In FIG. 3, the drainage bag 106 is coupled to a drainage bag actuation system 302 using the mounting fasteners 110 as seen in FIGS. 1-2B.

The drainage bag actuation system 302 includes a vertical rail 304, a horizontal rail 306, a tension control box 308, a movement control box 310, a slidable platform 312, floor tracks 314, a first motor 316, a second motor 318 and movement logic and/circuitry ("movement logic") 320. Additionally, the drainage bag actuation system 302 includes components included in the drainage bag actuation system 210 and discussed above such as the tension load cell sensor 224 and the IR sensor 226.

In the illustration of FIG. 3, the drainage bag actuation system 302 is illustrated in a first position, wherein the first position refers to a first vertical position of the movement control box 310, a first rotational position of the movement control box 310 and a first horizontal position of the slidable platform 312. Although a second or other position is not illustrated, the drainage bag actuation system 302 may be placed in a second position as a result of movement caused by either the first motor 316 within the movement control box 310 or by the second motor 318 within the slidable platform 312.

In particular, the embodiment of the drainage bag actuation system 302 illustrated in FIG. 3 may automatically adjust the positioning of the drainage bag 106 by moving either the movement control box 310 and/or the slidable platform 312. The movement control box 310 may be moved in either vertically or rotationally about the vertical rail 304. The slidable platform 312 may be moved horizontally along the floor tracks 314. As with the drainage bag actuation system 210 of FIGS. 2A-2B, one function of the drainage bag actuation system 302 is to alter the positioning of the catheter tubing 104 to remove any dependent loops. As such, the drainage bag actuation system 302 provides the same benefits as discussed above with respect to FIGS. 2A-2B.

The drainage bag actuation system 302 includes movement logic 320 within the slidable platform 312 that obtains measurements from the tension load cell sensor 224 and determines whether tension of the catheter tubing 104 is within a predetermined preferred range in a similar manner as discussed above with respect to the drainage bag actuation system 210. Upon determining that the tension of the tubing 104 exceeds an upper threshold of the predetermined preferred range, the movement logic 320 provides an electrical signal to either the first motor 316 and/or the second motor 318 thereby activating one or both motors.

Activation of the first motor 316 may be in a vertical direction and/or rotationally about the vertical railing 304. The drainage bag actuation system 302 includes the IR sensor 226 (e.g., at an end of the horizontal railing 306) which determines the distance between the IR sensor 226 and a ground surface. As with the movement logic 222, the movement logic 320 utilizes known dimensions of the drainage bag 106 to determine a distance between the bottom of the drainage bag 106 and the ground surface. The vertical movement of the movement control box 310 is dependent on the distance between the bottom of the drainage bag 106 and the ground surface.

When the distance between the bottom of the drainage bag 106 and the ground surface is greater than a minimum distance threshold, the movement logic 320 may activate the first motor 316 to move the movement control box 310 in a downward direction. The movement logic 320 may receive measurements from the IR sensor 226 and the tension load cell sensor 224 at regular intervals while the first motor 316 is activated. The measurements (received via electrical signals) enable the movement logic 320 to determine (i) when the tension of the catheter tubing 104 is within a predetermined preferred range, and (ii) when the distance between the bottom of the drainage bag 106 and the ground surface is equal to the minimum distance threshold. In the situation in which the tension of the catheter tubing 104 is above an upper threshold of the predetermined preferred range and the distance between the bottom of the drainage bag 106 and the ground surface is equal to the minimum distance threshold, the movement logic 320 may instruct the first motor 316 to stop the downward movement of the movement control box 310 and either activate (i) the first motor 316 to rotate the movement control box 310, and/or (ii) the second motor 318 causing the slidable platform 312 to move horizontally along the floor tracks 314.

When the distance between the bottom of the drainage bag 106 and the ground surface is equal to (or exceeds) the minimum distance threshold, the movement logic 320 does not activate the first motor 316 in order to avoid placing the drainage bag 106 close to or in direct contact with the ground surface. Instead, as discussed above, may either activate (i) the first motor 316 to rotate the movement control box 316, and/or (ii) the second motor 318 causing the slidable platform 312 to move horizontally along the floor tracks 314.

During activation of any motor of the drainage bag actuation system 302, the movement logic 320 receives measurements from the tension load cell sensor 224 at regular intervals in order to deactivate the motor(s) when the tension of the tubing 104 is within the predetermined preferred range.

Figure 4:
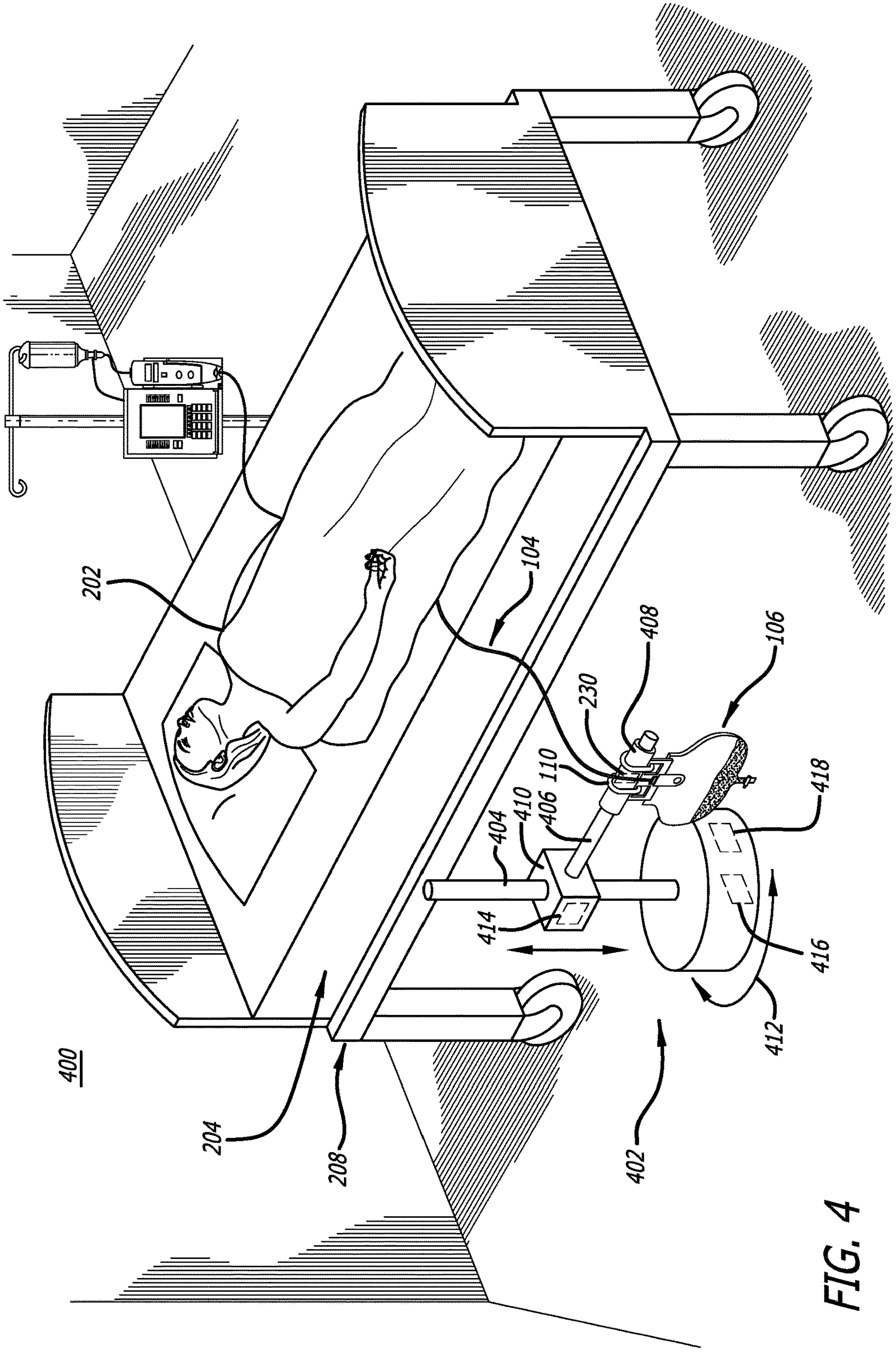
FIG. 4 illustrates a simplified view of a third embodiment of a drainage bag actuation system according to some embodiments.

Referring to FIG. 4, a perspective view of a hospital bed coupled to a third embodiment of a drainage bag actuation system is shown according to some embodiments. In a similar manner as illustrated in FIGS. 2A-3, catheter tubing 104 extends from the patient 202 to the drainage bag 106, which is not coupled directly to the bed frame railing 208. In FIG. 4, the drainage bag 106 is coupled to a drainage bag actuation system 402 using the mounting fasteners 110 as seen in FIGS. 1-3.

The drainage bag actuation system 402 includes a vertical rail 404, a horizontal rail 406, a tension control box 408, a movement control box 410, a base 412, a first motor 414, an optional second motor 416 and movement logic and/circuitry ("movement logic") 418. Additionally, the drainage bag actuation system 402 includes components included in the drainage bag actuation systems 210, 302 and discussed above such as the tension load cell sensor 224 and the IR sensor 226.

In the illustration of FIG. 4, the drainage bag actuation system 402 is illustrated in a first position, wherein the first position refers to a first vertical position and a first rotational position of the movement control box 410. Although a second or other position is not illustrated, the drainage bag actuation system 402 may be placed in a second position as a result of movement caused by either the first motor 416 within the movement control box 410 or by the optional second motor 318 within the base 412.

In particular, the embodiment of the drainage bag actuation system 402 illustrated in FIG. 3 may automatically adjust the positioning of the drainage bag 106 by moving the movement control box 410 either in a vertical direction or rotationally about the railing 404. As with the drainage bag actuation systems 210, 302, one function of the drainage bag actuation system 402 is to alter the positioning of the catheter tubing 104 to remove any dependent loops. As such, the drainage bag actuation system 402 provides the same benefits as discussed above with respect to FIGS. 2A-3.

The drainage bag actuation system 402 includes movement logic 418 within the base 412 that obtains measurements from the tension load cell sensor 224 and determines whether tension of the catheter tubing 104 is within a predetermined preferred range in a similar manner as discussed above with respect to the drainage bag actuation systems 210, 302. Upon determining that the tension of the tubing 104 exceeds an upper threshold of the predetermined preferred range, the movement logic 418 provides an electrical signal to either the first motor 414 and/or the optional second motor 416 thereby activating one or both motors.

Activation of the first motor 414 may be in a vertical direction and/or rotationally about the vertical railing 404. The drainage bag actuation system 402 includes the IR sensor 226 (e.g., at an end of the horizontal railing 406) which determines the distance between the IR sensor 226 and a ground surface. As with the movement logic 222, 320, the movement logic 418 utilizes known dimensions of the drainage bag 106 to determine a distance between the bottom of the drainage bag 106 and the ground surface. The vertical movement of the movement control box 410 is dependent on the distance between the bottom of the drainage bag 106 and the ground surface.

When the distance between the bottom of the drainage bag 106 and the ground surface is greater than a minimum distance threshold, the movement logic 418 may activate the first motor 414 to move the movement control box 410 in a downward direction. The movement logic 418 may receive measurements from the IR sensor 226 and the tension load cell sensor 224 at regular intervals while the first motor 414 is activated. The measurements (received via electrical signals) enable the movement logic 418 to determine (i) when the tension of the catheter tubing 104 is within a predetermined preferred range, and (ii) when the distance between the bottom of the drainage bag 106 and the ground surface is equal to the minimum distance threshold. In the situation in which the tension of the catheter tubing 104 is above an upper threshold of the predetermined preferred range and the distance between the bottom of the drainage bag 106 and the ground surface is equal to the minimum distance threshold, the movement logic 418 may instruct the first motor 414 to stop the downward movement of the movement control box 410 and activate the first motor 316 to rotate the movement control box 410.

When the distance between the bottom of the drainage bag 106 and the ground surface is equal to (or exceeds) the minimum distance threshold, the movement logic 418 does not activate the first motor 414 in order to avoid placing the drainage bag 106 close to or in direct contact with the ground surface. Instead, as discussed above, may activate the first motor 414 to rotate the movement control box 410.

During activation of any motor of the drainage bag actuation system 402, the movement logic 418 receives measurements from the tension load cell sensor 224 at regular intervals in order to deactivate the motor(s) when the tension of the tubing 104 is within the predetermined preferred range.

In some embodiments, such as any of those disclosed herein, the drainage bag systems 210, 302, 402 may include alarm logic that is configured to activate an alarm when a continuous negative slope cannot be created within the tubing 104. For example, when the tension of the tubing 104 is not within the predetermined preferred range and additional movement of the components of the drainage bag system is not possible (e.g., the bottom of the drainage bag 106 is too close to the ground surface and no rotation mechanism has not been implemented in the embodiment), an alarm may be activated that alerts medical professionals to assess the patient and the status of the catheter.

In any of the embodiments discussed above, the movement logic may perform a tension release operations that automatically adjust the positioning of the drainage bag to provide slack (e.g., to reduce the tension in the tubing) when the tension load cell sensor obtains a measurement indicating that the tension in the tubing is above a maximum threshold of the predetermined (e.g., preferred) range. For instance, the patient may have previously rolled toward the drainage bag reducing the amount of tension in the tubing causing a dependent loop. As a result, the drainage bag actuation system may have automatically adjusted the positioning of the drainage bag to increase the amount of tension in the tubing in order to remove the dependent loop. However, as the patient subsequently rolls away from the drainage bag increasing the tension in the tubing, the amount of tension in the may exceed a maximum threshold of the predetermined preferred range. At which time, the drainage bag actuation system may automatically adjust the positioning of the drainage bag to reduce the tension in the tubing.

Figure 5:
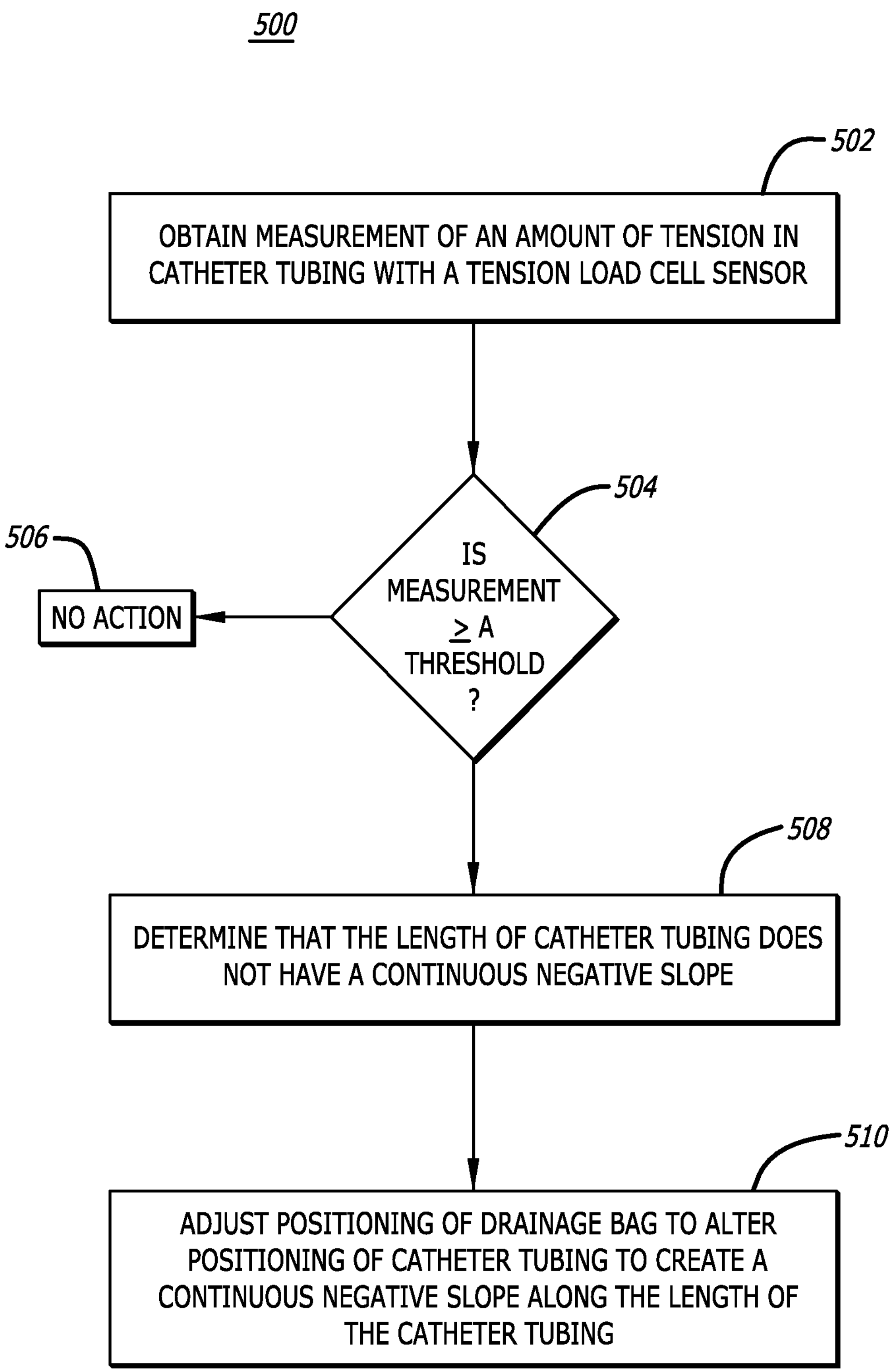
FIG. 5 is a flowchart illustrating an exemplary method for automatically adjusting a positioning of a drainage bag according to some embodiments.

Referring to FIG. 5, a flowchart illustrating an exemplary method for automatically adjusting a positioning of a drainage bag is shown according to some embodiments. Each block illustrated in FIG. 5 represents an operation performed in the method 600 performed by a drainage bag actuation system, such as any of the drainage bag actuation systems 210, 302, 402 discussed above. The method 500 starts when a measurement indicating an amount of tension in a catheter tubing is obtained (block 502). In some embodiments, as discussed above, the amount of tension in the tubing is obtained using a tension load cell sensor of the drainage bag actuation system.

Subsequent to the tension load cell sensor obtaining the amount of tension in the tubing, the drainage bag actuation system determines whether the measurement of the amount of tension is greater than or equal to a predetermined tension threshold (block 504). When the measurement is not greater than or equal to the tension threshold, no action is taken (block 506).

However, when the measurement is greater than or equal to the tension threshold, the drainage bag actuation system determines that the length of the catheter tubing does not have a continuous negative slope (block 506). As discussed above, the lack of a continuous negative slope due to a lack of tension in the tubing may be caused by excess tubing creating a dependent loop. Responsive to determining that the length of the catheter tubing does not have a continuous negative slope, the drainage bag actuation system automatically adjusts the positioning of the drainage bag to alter the positioning of the catheter tubing to create a continuous negative slope along the length of the catheter tubing (block 510). Multiple embodiments of drainage bag actuation systems are discussed above with respect to FIGS. 2A-4 that provide detail as to operations performed in automatically adjusting the positioning of the drainage bag.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An automated drainage bag actuation system, comprising:
- a first railing;
- a control box coupled to the first railing and configured to receive mounting fasteners that couple a drainage bag to the control box, the control box including a tension load cell sensor;
- a first motor; and
- circuitry electrically coupled to the first motor and the tension load cell sensor,
- wherein the circuitry is configured to receive data from the tension load cell sensor indicating an amount of tension in tubing extending from the drainage bag and transmit one or more electrical signals to activate the first motor, thereby causing adjustment of a positioning of the drainage bag.

2. The automated drainage bag actuation system of claim 1, further comprising an infrared (IR) sensor coupled to the circuitry, the IR sensor configured to obtain a distance measurement of a distance between the IR sensor and a ground surface or intervening object, wherein the one or more electrical signals activating the first motor are based in part on the distance measurement.

3. The automated drainage bag actuation system of claim 1, further comprising a second railing coupled to the first railing.

4. The automated drainage bag actuation system of claim 3, wherein activation of the first motor causes adjustment of the positioning of the drainage bag in a vertical direction along the second railing.

5. The automated drainage bag actuation system of claim 3, wherein activation of the first motor causes adjustment of the positioning of the drainage bag rotationally about the second railing.

6. The automated drainage bag actuation system of claim 1, further comprising a base including a second motor, wherein the circuitry is configured to receive the data from the tension load cell sensor indicating the amount of tension in the tubing extending from the drainage bag and transmit the one or more electrical signals to activate the second motor causing adjustment of the positioning of the drainage bag.

7. The automated drainage bag actuation system of claim 6, further comprising one or more tracks, wherein activation of the second motor causes horizontal movement along the one or more tracks.

8. The automated drainage bag actuation system of claim 6, wherein the second motor causes rotation of the drainage bag about a vertical axis.

9. The automated drainage bag actuation system of claim 1, wherein the first railing is a horizontal railing and activation of the first motor causes horizontal movement of the drainage bag along the first railing.

10. The automated drainage bag actuation system of claim 1, wherein the circuitry is located within the control box.

11. A method of automatically adjusting a positioning of a drainage bag using an automated drainage bag actuation system, the method comprising:
- obtaining a measurement indicating an amount of tension in a tubing extending from the drainage bag;
- determining the amount of tension is outside of a predetermined range; and
- transmitting an electrical signal to a first motor thereby causing adjustment of the positioning of the drainage bag.

12. The method of claim 11, wherein the automated drainage bag actuation system further comprises:
- a first railing,
- a control box coupled to the first railing and configured to receive mounting fasteners that couple the drainage bag to the control box, the control box including a tension load cell sensor,
- the first motor, and
- circuitry electrically coupled to the first motor and the tension load cell sensor.

13. The method of claim 12, wherein the measurement indicating the amount of tension is obtained by the tension load cell sensor of the automated drainage bag actuation system.

14. The method of claim 12, wherein determining the amount of tension is outside of the predetermined range and transmitting the electrical signal are both performed by the circuitry of the automated drainage bag actuation system.

15. The method of claim 12, further comprising obtaining a first distance measurement of a distance between an infrared (IR) sensor and a ground surface or intervening object.

16. The method of claim 15, wherein the automated drainage bag actuation system further includes the IR sensor coupled to the circuitry, and wherein one or more electrical signals activating the first motor are based in part on the first distance measurement.

17. The method of claim 15, wherein causing adjustment of the positioning of the drainage bag further includes:

activating the first motor of the automated drainage bag actuation system based at least in part on the first distance measurement; and deactivating the first motor based at least in part on a second distance measurement obtained by the IR sensor at a time subsequent to a time at which the first distance measurement was obtained.

18. The method of claim 11, wherein adjustment of the positioning of the drainage bag occurs along a vertical axis.

19. The method of claim 11, wherein adjustment of the positioning of the drainage bag includes rotation about a vertical axis.

* * * * *